United States Patent
Roskowski (10) Patent No.: US 8,010,081 B1
(45) Date of Patent: Aug. 30, 2011

(54) AUDITING SYSTEM FOR WIRELESS NETWORKS

(75) Inventor: Steve Roskowski, Los Gatos, CA (US)

(73) Assignee: Carrier IQ, Inc., Mountain View, CA (US)

( * ) Notice: Subject to any disclaimer, the term of this patent is extended or adjusted under 35 U.S.C. 154(b) by 989 days.

(21) Appl. No.: 11/777,953

(22) Filed: Jul. 13, 2007

Related U.S. Application Data (60) Provisional application No. 60/807,451, filed on Jul. 14, 2006.

(51) Int. Cl.
*H04M 11/00* (2006.01)

(52) U.S. Cl. .................................. 455/406; 379/114.04

(58) Field of Classification Search .......................... None
See application file for complete search history.

(56) References Cited

U.S. PATENT DOCUMENTS

| | | | |
|---|---|---|---|
| 5,706,330 A * | 1/1998 | Bufferd et al. ................ | 455/405 |
| 5,889,474 A | 3/1999 | LaDue | |
| 6,097,336 A | 8/2000 | Stilp | |
| 6,167,358 A | 12/2000 | Othmer et al. | |
| 6,205,326 B1 | 3/2001 | Tell et al. | |
| 6,266,788 B1 | 7/2001 | Othmer et al. | |
| 6,516,198 B1 | 2/2003 | Tendler | |
| 6,529,136 B2 | 3/2003 | Cao et al. | |
| 6,745,011 B1 | 6/2004 | Hendrickson et al. | |
| 6,754,470 B2 | 6/2004 | Hendrickson et al. | |
| 7,149,292 B2 * | 12/2006 | Wardin et al. ............ | 379/114.03 |
| 2002/0072359 A1 | 6/2002 | Moles et al. | |
| 2003/0159088 A1 | 8/2003 | Phillips et al. | |
| 2004/0152444 A1 * | 8/2004 | Lialiamou et al. .......... | 455/406 |
| 2005/0031103 A1 * | 2/2005 | Gunderman ............. | 379/114.03 |
| 2006/0007870 A1 | 1/2006 | Roskowski et al. | |
| 2006/0007901 A1 | 1/2006 | Roskowski et al. | |
| 2006/0023642 A1 | 2/2006 | Roskowski et al. | |
| 2007/0087727 A1 * | 4/2007 | Tseitlin et al. ................. | 455/406 |
| 2007/0111706 A1 * | 5/2007 | Kumar et al. .................. | 455/406 |
| 2007/0130103 A1 * | 6/2007 | Malone et al. ..................... | 707/1 |
| 2007/0287414 A1 * | 12/2007 | Dawson et al. ............... | 455/405 |
| 2008/0069324 A1 * | 3/2008 | Bevente et al. .......... | 379/114.22 |
| 2008/0207164 A1 * | 8/2008 | Dawson et al. ............... | 455/406 |
| 2008/0268813 A1 * | 10/2008 | Maes ............................ | 455/406 |
| 2008/0270299 A1 * | 10/2008 | Peng ............................... | 705/40 |
| 2009/0055297 A1 * | 2/2009 | Gunderman .................... | 705/30 |

* cited by examiner

*Primary Examiner* — Ajit Patel (74) *Attorney, Agent, or Firm* — Workman Nydegger (57) ABSTRACT

Independently evaluating the performance of the billing systems of wireless carriers. Devices are provisioned with a collection profile that enables the devices to capture event data at the devices that corresponds to billable events. The collected data is uploaded to a collection and management system. The collection and management system can then compare the collected event data with the billable data generated by the billing systems of wireless carriers to identify discrepancies in the billable events, determine relative performance of elements in the carrier's wireless networks, and identify traffic or load based loss in carrier's billable data.

25 Claims, 4 Drawing Sheets

AUDITING SYSTEM FOR WIRELESS NETWORKS

CROSS REFERENCE TO RELATED APPLICATIONS

This application claims the benefit of U.S. Application Ser. No. 60/807,451, filed Jul. 14, 2006 and entitled AUDITING SYSTEM FOR WIRELESS NETWORKS, which application is incorporated by reference in its entirety.

BACKGROUND OF THE INVENTION

1. The Field of the Invention

The present invention relates generally to billing systems in wireless communication networks. More particularly, embodiments of the invention relate to systems and methods for evaluating the performance of billing systems in wireless cellular networks.

2. The Relevant Technology

The convenience and popularity of mobile or wireless devices is undeniable and their use continues to increase as more users obtain wireless devices and as wireless service becomes available in new areas. Not surprisingly, there is significant competition among the various providers or carriers of wireless services. In fact, many of these carriers either have their own wireless network or they have agreements with other carriers to use their wireless networks. These agreements effectively extend the scope of a carrier's own network.

The end effect of these arrangements between carriers is evident on the various calling plans that are offered to end users. Many calling plans have a defined home calling area and many wireless calls often originate and end within the home calling area. If a call is made or received outside of the home calling area, however, the user is not precluded from wireless service. Rather, the user may accrue long distance and/or roaming fees to his or her account. Other calling plans provide nationwide service. This does not mean, however, that a wireless device cannot roam on other networks or use other networks during use. The absence of roaming fees further does not mean that a user is always operating on the carrier's own network.

Wireless carriers provide access to their networks for a fee that is either recurring monthly (post paid) or charged immediately to an account associated with the user (pre-paid). Regardless of the specifics, customers are generally billed for events (calls, text messages, and other chargeable actions). Regardless of whether a customer is using the post-paid or pre-paid model, it is necessary to collect the data from many different records in order to bill a customer successfully.

In the post-paid model, for example, all of the calls made by a user are monitored by the carrier. When the allowable minutes are exceeded, the user may begin to accrue charges on a per minute basis. Similarly, messaging requires monitoring the bandwidth consumed by a user or the total number of messages sent by a user. When one considers that there are 10s to 100s or millions of cellular devices in use making billions of calls per month, sending messages, and performing other chargeable events, the complexity of a carrier's billing system becomes apparent. However, this is only the beginning of the complexity because of the fact that some uses of cellular devices may involve the networks of multiple carriers, affiliates and operators. In order to correctly charge the end user, a billing system for a given carrier is required to process data from thousands of network elements, from the billing carrier itself, from affiliated yet independent carriers and from other roaming partners that have minimal relationships with the primary carrier. After collecting this data, it then becomes necessary to process the collected data and then ultimately generate a bill for each customer of the carrier. As can be appreciated, the billing system of a wireless carrier is very complex to operate and maintain.

In the pre-paid model, it is still necessary to collect the same type of information that is collected in the post-paid model. The primary difference relates to how the user is billed based on the data collected by the carrier. In the pre-paid model, for example, the user may purchase an amount of minutes. If the user exceeds this limit, the user may accrue additional minute charges that are then billed to the user, taking into account that the user has already paid for some services. In the post-paid model, the user is billed after the fact for the entire amount. Regardless of the billing scheme used by a carrier, any billing performed by the carrier is ultimately tied to the collected data and to usage of the device.

Not surprisingly, some records or data are inevitably lost in such a complex system. This can occur for a variety of different reasons. Some of the systems or system elements, for example, are not configured correctly or have errors in their implementation. Partners or affiliated networks may not correctly report information to the primary billing carrier or have errors in their system elements. As a result, wrong data, missing data, or incorrect processing results in transactions or events that are not properly represented, missing and unaccounted for, or simply wrong. The distributed nature of the various systems and networks that interact in order to acquire the data needed to generate a bill makes it difficult to systematically correct these types of issues or problems that occur in wireless networks and associated billing systems.

In addition to simply missing data, information may also be corrupted during processing or generation. If a network element incorrectly timestamps a record for example, the calculation of call duration can be skewed, resulting in incorrect bills. While the actual errors for individual calls may be limited, the resulting billing error accrued over billions of calls can be significant.

In order to resolve these issues, improve the quality and accuracy of bills and charges, and ultimately either generate more revenue (in the case of under charging) or reduce liability (in the case of over charging), it is desirable to have a mechanism for auditing the accuracy of the billing transactions. However, the only source of data associated with the call are the very same systems that are used to generate the records in the first place.

SUMMARY OF THE INVENTION

These and other limitations are overcome by embodiments of the invention, which relate to systems and methods for evaluating the performance of wireless billing systems. Embodiments of the invention generally collect event data directly from the end user devices and independently of the billing systems used by wireless carriers. The independently collected data can then be used to audit the data collected by the carrier.

In one embodiment, devices operating in a wireless network track or record events, including billable events that occur on a wireless device (e.g., a call, a text message, browsing activity, etc.). This information can be stored on the device and/or transmitted to a server. Each billable event can be identified accordingly from the recorded events.

In addition to recording the events that occur on the device, the environment is also identified for the recorded events (e.g., network or carrier, roaming state of device, etc.). The events are then transmitted to a collection system that uses the event data to audit the billed data generated by carriers. This can result in identifying discrepancies in the billed data in a manner that enables systematic issue identification and resolution. For example, the billed data may indicate that the time used by the device for calls was a particular number of minutes. The recorded event data can verify that the device was actually used for calls for that number of minutes.

In another example, a collection system provisions multiple devices with a collection profile that is configured to enable the device to identify and collect billable events at the user devices. The collection system then receives the collected data from the devices. The collection system can then audit the carrier's billable data using the independently collected event data.

Advantageously, the collected data can still be used to evaluate the carrier's data even when loss occurs because the loss of data is independent from the carrier's data. Further, sufficient devices can be provisioned to ensure a statistically accurate data set. In other embodiments, the collection profiles can ensure that clean event data is collected.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only typical embodiments of the invention and are not, therefore intended to be considered limiting of its scope, the invention will be described and explained with additional specificity and detail through the use of the accompanying drawings in which.

DETAILED DESCRIPTION OF THE PREFERRED EMBODIMENTS

Embodiments of the invention relate to systems and methods for using distributed wireless devices and other network nodes to implement monitoring and data collection. The data collected from these devices and network nodes can be used to evaluate the performance of billing systems in wireless networks. Embodiments of the invention operate to collect data on chargeable transactions or events independently of carrier's billing systems.

The collected data can thus be used as an independent data set to conduct a systematic and automatic audit of the billing systems. The nature of the collected data sets allow the audit to identify the end to end accuracy of the billing system as a whole or of individual bills. The collected data can also be used independently to identify specific elements within the billing system that are contributing to error conditions. The ability to identify specific elements of the network that contribute to error conditions may also take into account other aspects, such as the topology of the billing systems. The results of the audit can be used for many purposes including improving the accuracy of the billing system, which results in increased revenue or reduced liability.

Embodiments of the invention enable an independent auditing system to evaluate the performance of a carrier billing system or of a chain of carrier billing systems. Generally stated, data is collected directly from or by end user devices and then uploaded to or received by a collection and management system. The collected data from end user devices can include events that are identified and recorded at the device. The collected data can be evaluated and compared against a carrier's database of billed events.

Further, because the device based data can also include additional environmental data such as system, network, and base station identifiers, it is possible to compare the collected data to the carrier's billed events on a per system basis. By auditing at this level, the root cause of billing issues may be identified. The ability to more precisely identify situations or problems that result in incorrect billing data can be used to systematically improve the carrier's wireless network or interaction with other networks as well as improve the error rate in billed data.

Reference will now be made to the drawings to describe various aspects of exemplary embodiments of the invention. It should be understood that the drawings are diagrammatic and schematic representations of such embodiments and, accordingly, are not limiting of the scope of the present invention, nor are the drawings necessarily drawn to scale. Although embodiments of the invention are described in the context of wireless billing systems and the interaction of the billing systems of different carriers, one of skill in the art, with the benefit of the present disclosure, can appreciate the applicability of the invention to other systems where data is shared between networks or to a system where data is collected from multiple elements within that system.

Figure 1:
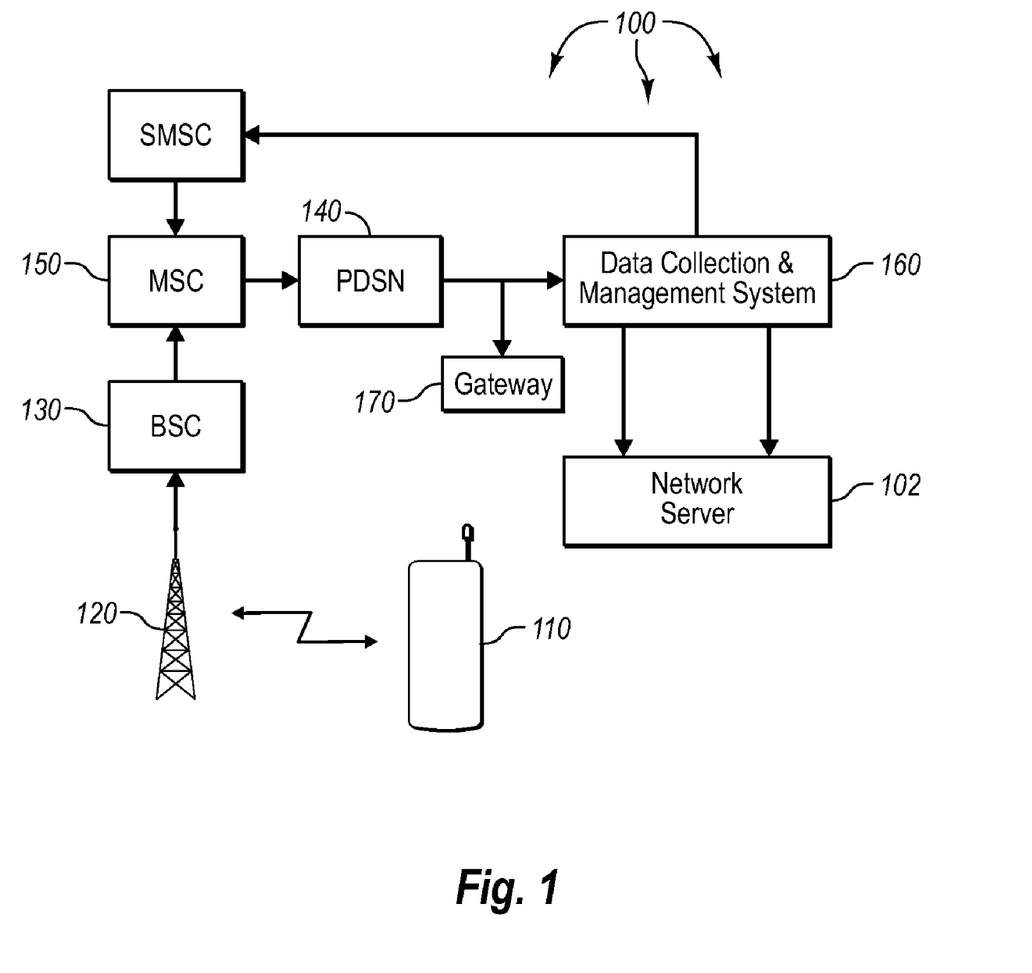
FIG. 1 illustrates one embodiment of a communications network over which wireless communications can be transmitted.

In order to describe the various methods of the invention, FIG. 1 illustrates an example of a wireless network 100 in which embodiments of the invention can be practiced. It should be understood, of course, that this and other arrangements and processes described herein are set forth for purposes of example only, and other arrangements and elements and network configurations may be included in the network 100. Further, those skilled in the art will appreciate that many of the elements described herein are functional entities that may be implemented as discrete components or in conjunction with other components, in any suitable combination and location, and by software, firmware and/or hardware.

The network 100 of FIG. 1 represents only an example of the suitable environments in which the invention can be implemented, and other network architectures are possible. In particular, wireless network 100 is described and illustrated as a Code Division Multiple Access (CDMA) network, whereas the invention can be practiced with other wireless networks, including Global System for Mobile Communications (GSM), Universal Mobile Telecommunications System (UMTS), Time Division Multiple Access (TDMA), Wideband Code Division Multiple Access (WCDMA), General Packet Radio Service (GPRS) networks, 802.11 networks and other networks, including those that will be developed in the future.

The wireless network 100 includes a radio frequency (RF) network that provides radio connectivity and session management for circuit-switched and packet data technology-based communication. Accordingly, wireless network 100 includes or interfaces with all of the elements necessary to route circuit-switched telephone calls and/or packet data communication through the network, including one or more wireless devices 110, a base station 120, base station controller (BSC) 130, mobile switching center (MSC) 150 and a packet data serving node (PDSN) 140. More specifically, the methods of the invention can be used in conjunction with a circuit-switched network, a packet data network, or both.

Some embodiments of the invention use Internet Protocol (IP) as its transport protocol, short message service (SMS), Short Data Burst services and/or other transport protocols. Wireless network 100 may also include a Home Location Register (HLR), Visiting Location Register (VLR), billing and provisioning systems, one or more gateways 170, the servers and infrastructure necessary to use short message service messages, and may include many other network elements not depicted in FIG. 1. Application servers or third party reporting systems (depicted as network server 102 in the exemplary embodiment), may reside outside network 100 and can be used in conjunction with the present invention. References herein to the terms "wireless network" or "the network" throughout should be construed as inclusive of the network infrastructure, servers, end user devices, and applications and services.

Wireless network 100 may further include third party network monitors, probes, and packet sniffers, which are known in the art, for use in conjunction with the present invention. Data collection and management system 160, while depicted for purposes of illustration as functioning in conjunction with the packet data network, may receive data from nodes on a circuit-switched network or elements of the system may be located in a circuit-switched network and receive data from a packet data network. Gateways 170, network monitors and other network elements may be employed to facilitate transmission of data between the networks and the data collection and management system 160. Furthermore, in one embodiment, elements of data collection and management system 160 may be implemented on one or more network servers residing within the network operator's network. Alternatively, data collection and management system 160 may be implemented as a service hosted by a service provider other than the network operator, and elements of the system may therefore reside outside the network operator's network and be equipped to communicate with the various nodes in the network operator's network.

Figure 2:
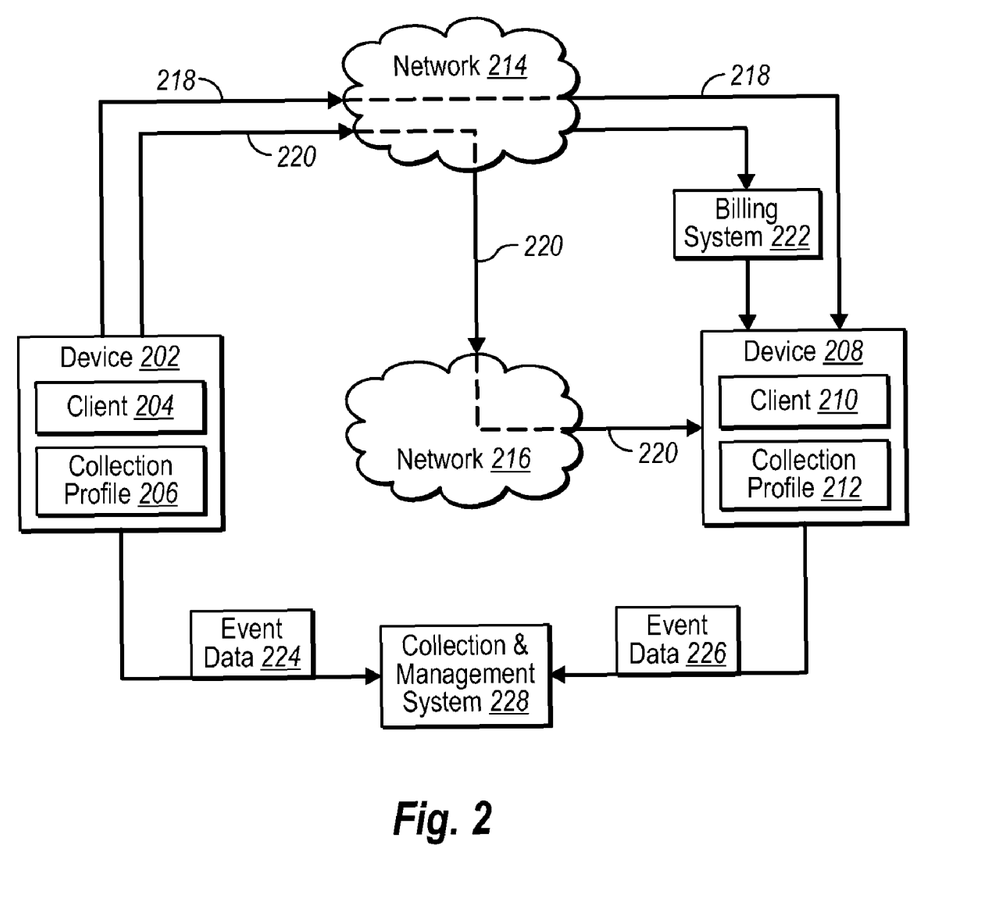
FIG. 2 illustrates communication paths for device use as well as the independence of a system that collects event data to audit the billable data generated by wireless carriers.

FIG. 2 illustrates the network of FIG. 1 from a different perspective. In FIG. 2, the device 202 is attempting to communicate with the device 208. One of skill in the art can appreciate that the communication originating from the device 202 may also be to a wireless server, a server computer, and the like. The use of the device 202 may also reflect an event that is billable or chargeable. In this example, the communication from the device 202 is captured by the client 204 operating on the device 202 as a chargeable event. The chargeable event may identify what the user did (e.g., made a call to the device 208, sent a text message, accessed the Internet, etc.), store how long the call or other event lasted, identify the network and infrastructure used by the device 202 to complete the call, identify bandwidth consumption, relevant settings of the device 202, and the like or any combination thereof. Similarly, because incoming calls are also chargeable events, the client 210 operating on the device 208 stores similar data in an event on the device 208.

FIG. 2 also illustrates the interaction of an event from the context of the wireless networks that may be involved in a communication or other use of a wireless device. In this example, the communication 218 between the device 202 and the device 208 flows only through the network 214. The network 214 may be the primary carrier network of the device 202. The network 214 may also be the primary network for the device 208. Alternatively, the network 214 may not be the primary network of the device 208. As a result, information regarding the event associated with the communication 218 needs to be communicated by the network 214 to the billing system 222 of the carrier for the device 208.

In another example, the communication 220 between the device 202 and the device 208 may require the use of the network 214 and the network 216. For example, the device 202 may be roaming and the communication 220 may be passed or routed through the network 214 and the network 220. In each network, the communication may include multiple switches, routers and other network elements that may route the communication through the various networks. Some of the switches may report to a first concentrator, while other switches or network elements may report to another concentrator or other device. As previously described, collecting this information from all of the various elements in distinct carrier networks poses a significant challenge. Ultimately, the collected data is shared between networks, as appropriate, to generate the billed events and to present a customer with a statement or bill.

In FIG. 2, each of the devices 202 and 208 collect some of the same data at the respective devices that is collected by the networks. The clients 204 and 210 collect the chargeable events for the devices 202 and 208. In this case, the client 204 then transmits the event data 224 of the device 202 to the system 228. Similarly, the client 210 transmits the event data 226 of the device 208 to the system 228. The collection of the event data 224 and 226 is independent of the data collected by the billing systems associated with the networks 214 and 216. In other words, the carriers that are providing wireless service do not typically use this data collected by the clients 204, 210. Because the collected event data is independent of the carrier data, it serves as a basis for auditing the carrier's data. The system 228 can process the raw event data 224 and 226 and compare it to the billing data generated by the carriers.

This comparison of data can identify whether an end user is being over-charged or under-charged. The comparison of data can also identify the magnitude of the problem in the various networks. A widespread problem can translate, for example, to significant revenue loss or substantial liability. The carrier can then use this information to make decisions regarding how to resolve the various issues identified by the audit of the carrier's data.

With additional analysis of the data sets (i.e., by combining the collected data with the billing system topology), the source of errors within the system can be determined. For example, in a situation where some switches report to a first element and other switches in the network report to a second element, an analysis of the event data 224 and 226 when compared to the billed data generated by the carrier's billing systems may reveal that there is an issue with one of the collecting elements. This element can then be reconfigured or fixed to address the problem revealed by an analysis of the event data 224 and 226. In this manner, problems in the networks can be systematically corrected.

For instance, an audit of the carrier's billing data using the collected data combined with the billing system topology may reveal that, for a certain percentage of users where an error was found, a common network element was involved in the usage of the customer's devices. This may suggest that this element is incorrectly configured or is not operating properly. An example of such an error could be an incorrect timestamp applied by a network element. An incorrect timestamp, from the perspective of a single device, may be relatively insignificant, contributing a few seconds to the duration of calls perhaps. However, if the network element handles a large number of chargeable events for a large number of devices, the issue would be significant to the carrier. The audit of the carrier's billing data may reveal a problem in the network that has a substantial impact on the carrier's revenue or liability. In this manner, the data collected from the end user devices, combined with billing topology, can be used in an audit to identify the magnitude of various problems and may have an impact on the carrier's resolution of those problems.

In one embodiment of the invention, the data collection and management system 228 can provide a service quality platform to dynamically generate and download to a population of wireless devices rule-based data collection profiles such as the collection profiles 206 and 212. Alternatively, the collection profiles can be an inherent part of each device and no provisioning is required. Data collection profiles may be generated manually by a network administrator, a software developer or other personnel involved in the operation of the network, created offline as a portion of a data analysis solution, or automatically generated based on network parameters or other events. Data collection profiles, service quality platforms, and the data collection and management system 228 are also described in U.S. patent application Ser. No. 11/175,857, filed Jul. 5, 2005 and entitled "Collection of Data at Target Wireless Devices Using Data Collection Profiles", which is hereby incorporated by reference in its entirety.

Data collection profiles define what information is to be collected on the devices in response to which conditions and events, as well as the conditions and events that cause the device to upload the collected information. Conditions or events include any occurrence in the network or on the device that the device can sense, such as a chargeable event like a completed call, a received call, a sent or received message, Internet access, and the like. Conditions or events may also include, by way of example, call dropping or a user pressing a button on the device. Conditions and events also include the passage of time, or a request from a network administrator that the device report information back to the server.

In the embodiment, a population of wireless devices that is to receive the data collection profile and execute data collection is selected based on the characteristics, capacity, and availability of an end user's wireless device. As part of the target wireless device qualification and selection process, particular attention may be directed to implementing the collection of data in such a way as to avoid overwhelming end user devices. Similarly, when defining the data collection rules in the data collection profile, consideration is given to the impact on device and network resources of the desired data collection activity, and the rules defining profile download, data collection, and upload of collected data are defined in such a way as to avoid adversely impacting network performance. For example, in some cases, uploading collected data may occur only in off-peak times when device and network activity is particularly low. Furthermore, because network monitoring and data collection activity is expensive in terms of the device and network resources utilized, in addition to the rigorous device qualification process, methods of the invention provide the ability to structure a data collection profile to ensure that extraneous data is filtered during the data collection process and that only the most relevant and reliable data is presented for analysis with regard to a particular issue.

In this example, the collection profile 206 and the collection profile 212 is configured to record events that are typically billed by the various carriers. The collection profile 206 and 212 can also be adapted to collect other events. In fact, some of these events may provide context or may be used for other purposes. Each event, as previously described, may identify the action of the user as well as the result of the action. In other words, the event may identify whether the detected event was billable. The environment is also included in each event or, where applicable, in a collection or series of events. The environment may include, by way of example only, the network and infrastructure used in the action performed by the device, the time and date, the device settings, and the like or any combination thereof. The collected events or data can then be uploaded immediately, or at a later time. In fact, the collection of data is not required to be performed in real time. The data can be accumulated and stored on the device for some period of time before it is uploaded. This enables the device to store and forward the data. In one embodiment, uploading the collected data is performed in a manner that minimally intrudes on use of the device by the user and that minimizes impact on network performance.

The collected data from the devices 202 and 208 (which are representative of multiple devices) may be a statistically accurate set of data representing real events from real users and is accumulated independently from existing systems that collect similar billing data. In some situations, not all devices operating in the network will be enabled to collect the event data. In addition, it is possible that some of the event data on some of the devices may be lost (buffer overflow, for example). However, this lossiness is independent of the billing system.

By comparing the collected event data with the billing data collected by the carriers, it is possible to identify discrepancies and obtain a representation of how many billable events are lost, misrepresented, or simply wrong. In addition, the collected event data can be analyzed based on some of the properties of either the devices or of the event data. For example, an analysis of the event data 224 and 226 may indicate that a particular wireless affiliate or partner has more discrepancies than other partners. Specific instances of missed transactions can be used by the partner to drive an internal audit process. An analysis of the event data 224 and 226 can be used to correlate tower and sector information with carrier infrastructure to determine relative performance of specific elements. This analysis can be further refined based on make or model of the specific elements to identify whether elements from a particular vendor have a higher fail rate. The analysis of the event data 224 and 226 can also indicate if there is loss in the billable events that can be attributed to load or traffic on the various networks.

FIGS. 1 and 2 further illustrate details concerning an implementation of a data collection and management system including the modules or components operating on a device 202 or 208 as well as some of the related components of a wireless network with which it can be used. The functionality disclosed herein may be employed in connection with a wide variety of network devices, either wireless or wireline, including radios, personal digital assistants ("PDA"), network servers, desktop computers and other devices associated with network communication.

In the exemplary embodiment, the device 202 (or more generally the device 110 illustrated in FIG. 1) enables an end user to gain access to telephony services and is equipped to provide access to Internet or multimedia data through any suitable protocol that allows target wireless device 110 to participate in a packet data network. The wireless device 110 can be substantially any mobile wireless device that can communicate in the environment of wireless network 100, and can be a wireless telephone handset, a wireless personal digital assistant (PDA), or another wireless communication device. The wireless devices can also be referred to as mobile stations, or mobile devices, and hereinafter will be referred to as wireless devices.

The wireless device 110 has a local memory that is used to locally store data that is transmitted over wireless network 100 and permits the execution of software such as an operating system and applications, and to otherwise support the operation of the wireless station. In addition, the wireless device 110 is enabled with a service quality client software (client 204 and 210 in this example) that allows it to participate in data collection activities by receiving and executing data collection profiles and otherwise communicating with a service quality platform of data collection and management system 160. The client 202 may be installed on the wireless device by a variety of methods, including installation at the time of manufacture, various download methods such as placing the device in a cradle which is connected via a cable to a computer, or using any number of over-the-air methods.

Development environments such as BREW and JAVA may also reside on the wireless device and support such downloads of the client 202 or otherwise support operation of the data collection system. It should be noted that in other embodiments, the client 202 may also be installed on other nodes or system elements in the network in order to receive and execute data collection profiles as previously noted. For example, in addition to the data collection activities of the wireless devices, the client 202 may be installed on an application server within the network or on the PDSN so these network nodes may participate in the data collection activity.

The data collection and management system 160 may be implemented as a service hosted on a server or a server system of a service provider other than the network operator or, in other implementations some or all of the functionality of the data collection and management system 160 may be provided in the form of a stand-alone software package suitable for installation on a network server and/or other network systems within the network operator's wireless network 100. Accordingly, the scope of the invention should not be construed to be limited to any particular form of implementation of the data collection and management system 160.

The data collection and management system 160 generally serves to create and manage various queries and to generate data collection profiles as may be employed in the collection of data. Further, the system 160 receives collected data and performs various analyses and other processes concerning the collected data from the client 202.

Figure 3:
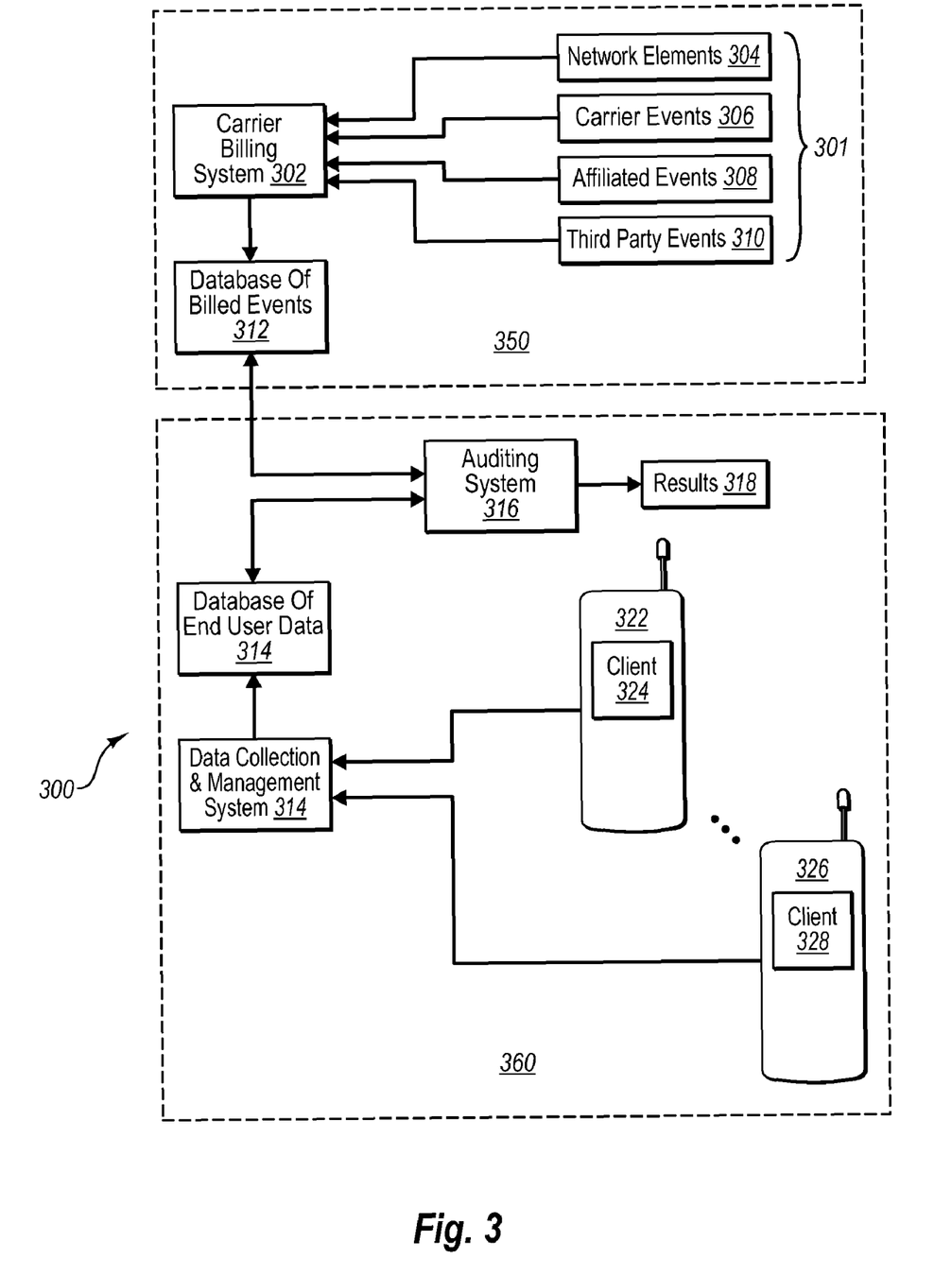
FIG. 3 illustrates an auditing system that collects event data independently of the wireless carriers and that generates results that reflect a comparison of the collected event data with the billed events generated by the wireless carriers.

FIG. 3 illustrates another block diagram of systems and methods for evaluating the performance of carrier's billing systems. In particular, FIG. 3 illustrates the independence of the auditing system 360 from the billing system 350. The following description further illustrates that the data collected by the auditing system 360 is independent of the billing data collected in the billing system 350.

In this example, a carrier billing system 302 receives records from which billing data is generated from a variety of different sources. The sources, in this example, include various network elements 304, records of carrier events 306 from the network of the carrier itself, records of affiliated events 308 from affiliated, but independent networks, and records of events 310 from third party networks.

The collective sources provide data representative of chargeable events 301. Examples of billing events include, by way of example and not limitation, calls, text messages, Internet access, or other chargeable actions or the like. Because the events 301 are collected from multiple sources that use different systems, it is likely that errors or incomplete information are present in the large set of events received by the carrier billing system 302. As previously described, the events 301 are received in various ways and do not enable the carrier billing system 302 to systematically correct the types of problems that often occur in the billing data. The carrier billing system 302 then processes the events 301 to produce billed events that can be stored in a database 312 of billed events.

Embodiments of the inventions provide an independent auditing system that can provide information to generally improve the carrier billing system 302. In this example, the data collection and management system 320 collects events directly from multiple devices operating in one or more wireless networks, represented by the devices 322 and 326. A client 324 operates on the device 322 and a client 328 operates on the device 326.

The clients 324 and 328 operate to record and collect events at the respective devices 322 and 326. The clients 324 and 328 monitor and record the actions performed by an end user. The clients 324 and 328 therefore identify events and more specifically billable events such as calls, text messaging, downloads, and the like. The clients 324 and 328 collect information for the events as previously described (environment, event type, carrier, etc.).

In one example, the chargeable events identified on the device 322, are often accumulated locally on the device 322. This enables the client 324 to handle situations where the device 322 cannot immediately upload the data to the system 320 for various reasons such as inadequate coverage, permissions, and the like. The buffer of stored billable events can be uploaded to the system 320 for analysis and storage.

If too many transactions occur before the series of chargeable events are reported then some of the data may be dropped (a buffer overflow occurs, for example). In some instances described below, the fact that data was dropped may not introduce any bias to the analysis of the collected data. Preferably, the client 324 notes that some of the data for the billable events was dropped or lost as well as the reason for the lost data. In this case, the reason for the lost data is insufficient memory in the allocated buffer of the device 322.

After the system 320 receives the event data from the devices that represents the chargeable events, the system 320 may analyze the data and store results in the database of end user data 314. The auditing system 316, which may in a part of the data collection and management system 320, can then compare or analyze the database 312 of billed events in view of the database 314 of end user data as previously described. For example, the results 318 of this analysis or comparison can be used to identify billing discrepancies, determine whether one partner has more discrepancies in their billable events than another partner, identify the relative performance of specific elements in a wireless network by correlating tower/sector information with the carrier infrastructure, determine if there is load or traffic based loss in the billable events, determine whether a particular class or type of billable event is missed more often than other types of billable events, and the like or any combination thereof.

Figure 4:
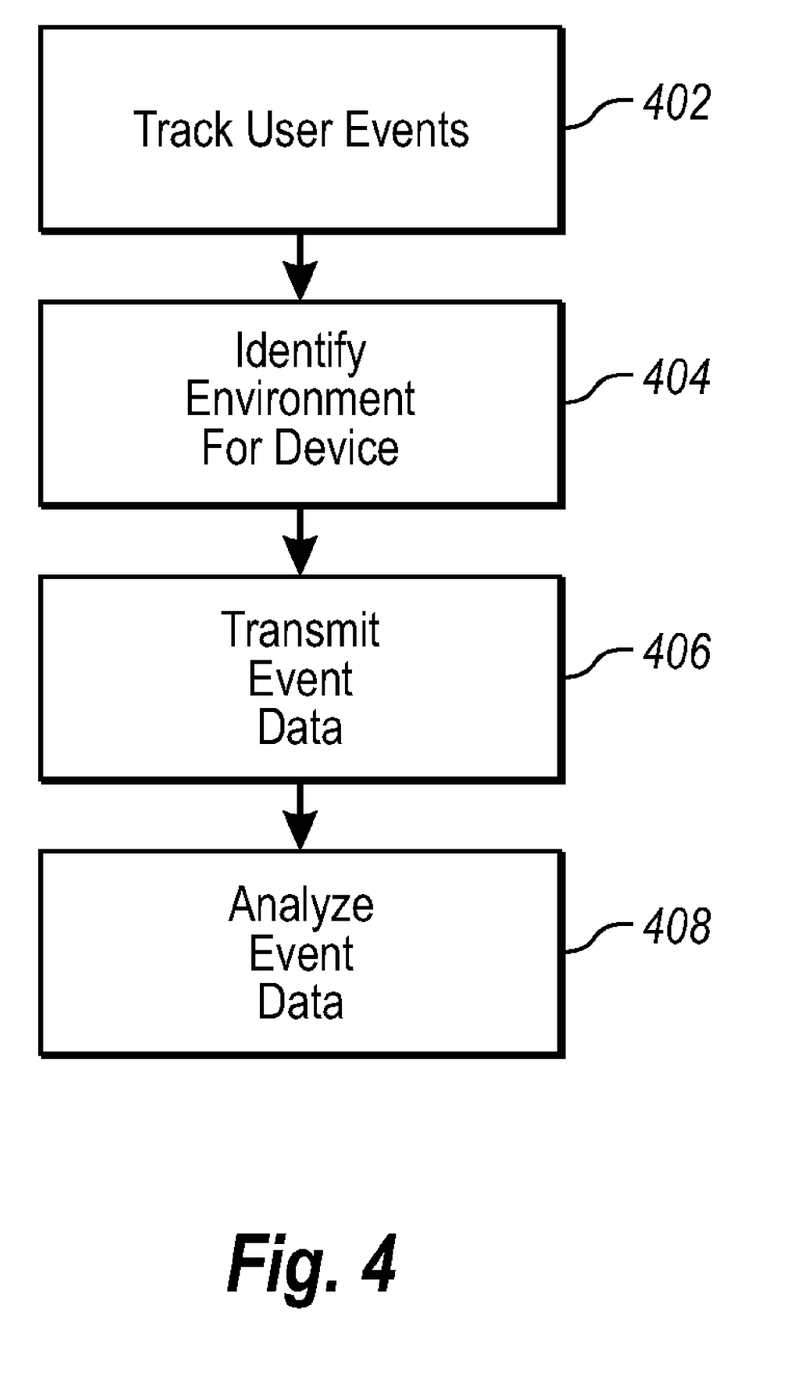
FIG. 4 is an exemplary method for evaluating the performance of the billing systems of wireless carriers.

FIG. 4 illustrates one embodiment of a method for evaluating the performance of a carrier's billing system. The method begins by tracking 402 events including user events on an end user device. This may include identifying and recording billable or chargeable events on the device or at a server. The identification and/or recording of such events is often achieved by a client operating on the device. When generating the event for the chargeable action of the user, the environment may also be identified 404 and included as part of the event. Next, the event data collected by the device is transmitted 406 to and received by a collection system on a remote server. The event data is then analyzed 408.

If the purpose of the analysis is to determine the accuracy of customers' bills in general or to determine the accuracy of the carrier's record of the transactions, then the analysis can proceed at a device level or on a statistical analysis that references a set of devices. For example, the analysis can be performed by analyzing the data from a set of devices. In this case, a statistically accurate set of data representing real users can be accumulated from the set of devices. In this case, however, it is possible that the collected data is not complete. More particularly, some of the devices may be unable to provide data, and not every transaction of each device is necessarily captured (e.g., a buffer overflow may occur in a device and the stored data may be lost).

However, this lossiness is typically independent of the billing system and the data that is actually captured is accurate. Thus, the lossiness of the collected data may not impact the analysis or the comparison between the data actually collected and the carrier's billing data because the analysis involves a comparison of the transactions actually collected against the carrier's data. Lost transactions are not compared and therefore do not contribute to any identified discrepancies because they are not considered in this embodiment of the analysis. In this example, the data actually collected from the end user devices can be compared to the raw transaction records of the carrier. Discrepancies between the carrier's data and with the data from the end user devices can be identified based on the comparison and a report on the amount of leakage can be generated.

As previously indicated, the ability to analyze billing accuracy can be independent of using the collected data for other purposes such as identifying network elements that may contribute to the leakage or to billing discrepancies. In other words, the data collected by the devices can be further analyzed based on properties inherent to the devices and/or network topology, among other considerations, to determine the root cause of a billing issue or other problem.

Each device can report other data in addition to the chargeable events (some of this information, however, may be considered as part of the chargeable events). Tower/sector information and other network infrastructure, for example, can be identified, device settings can be provided, and other aspects such as time and date of event can be included in the collected data.

With this information, it is possible to determine whether a certain network has more discrepancies than other networks. By correlating the tower/sector information with the carrier infrastructure database, it is possible to determine relative performance of specific network elements. In addition, in situations where several network elements are linked together, it is possible to analyze the collected data to identify other network issues. For example, if switch A and switch B both report to concentrator X, but switch C and switch D report to concentrator X through a different element, correlation of misses on traffic or other errors through A and B is indicative of an issue with the concentrator X, assuming other aspects of switches A-D are similar.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

Those skilled in the art will appreciate that the invention may be practiced in network computing environments with many types of computing system configurations, including cellular telephones and other wireless devices, server computers, personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may also be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a wireless network of a carrier that provides services to multiple end user devices, a method for evaluating a billing system of the wireless network, the method comprising:
    tracking one or more events on a user device, wherein the one or more events correspond to chargeable actions in a wireless network; and
    transmitting the one or more events with information noting that at least one event of the one or more events was dropped and a reason why the at least one event was dropped to a remote collection system on a server, wherein the collection system generates results from the one or more events that are used to audit billing data from a carrier of the wireless network.

2. A method as defined in claim 1, wherein tracking one or more events on a user device further comprises identifying chargeable events on the user device, wherein the chargeable events include one or more of an outgoing call, a received call, a sent message, a received message, or Internet access.

3. A method as defined in claim 2, wherein tracking one or more events further comprises identifying an environment for inclusion in each event.

4. A method as defined in claim 3, wherein identifying an environment for inclusion in each event further comprises at least one of:
    identifying a network or an infrastructure communicating with the user device; or
    identifying settings of the user device.

5. A method as defined in claim 1, wherein transmitting the one or more events to a remote collection system further comprises:
    storing the one or more events at the device; and
    forwarding the one or more events at a later time to the remote collection system.

6. A method as defined in claim 5, wherein transmitting the one or more events to a remote collection system further comprises transmitting the one or more events when an appropriate network is available.

7. A method as defined in claim 1, further comprising dropping certain events from the one or more events without creating a bias in the one or more events.

8. A non-transitory computer readable medium having computer executable instructions for performing the method of claim 1.

9. In a wireless network of a carrier that provides services to multiple end user devices, a method for evaluating a billing system of the wireless network, the method comprising:
    receiving event data from one or more end user devices operating in one or more wireless networks, wherein the event data represents chargeable events of the one or more end user devices; and
    auditing billable data from at least one carrier using the event data by comparing the event data with the billable data, wherein the event data is collected independently of the billable data, wherein auditing billable data from at least one carrier using the event data further comprises:
        correlating tower and/or sector information with carrier infrastructure data to determine relative performance of the tower and/or sector or to determine performance of other elements in the wireless network.

10. The method as defined in claim 9, further comprising:
    provisioning one or more end user devices with a collection profile, the collection profile configured to enable each device to identify and collect billable events at the end user device.

11. The method as defined in claim 9, wherein receiving event data from one or more end user devices operating in one or more wireless networks further comprises:
    identifying instances where certain events in the event data are lost; and
    discarding event data where the lost events impact analysis.

12. The method as defined in claim 10, wherein provisioning one or more end user devices with a collection profile further comprises deploying the collection profile to a sufficient number of end user devices such that statistically distributed losses result in an adequate sample set of the event data and such that event data with complete contextual data is captured.

13. The method as defined in claim 9, wherein auditing billable data from at least one carrier using the event data further comprises identifying specific instances of missed events in the billable data.

14. The method as defined in claim 9, wherein auditing billable data from at least one carrier using the event data further comprises determining if events missing or misrepresented in the billable data is attributable to traffic in the wireless networks.

15. The method as defined in claim 9, wherein auditing billable data from at least one carrier using the event data further comprises correlating missed or misrepresented events in the billable data with time of day and call volume in the wireless networks.

16. The method as defined in claim 9, wherein auditing billable data from at least one carrier using the event data further comprises correlating missed or misrepresented events in the billable data by type of event.

17. A non-transitory computer readable medium having computer executable instructions for performing the method of claim 9.

18. In one or more wireless networks that provide service to multiple end user devices, a method for evaluating performance of elements operating in a network, the method comprising:
    receiving event data from one or more devices operating in a wireless network, the event data including data representing chargeable events and environment data identifying elements of the wireless network;
    auditing billing data received from at least one carrier by comparing some of the event data with the billing data to identify a billing issue;
    correlating the event data with a topology of the wireless network; and
    identifying one or more elements in the wireless network that contribute to the billing issue.

19. The method of claim 18, wherein auditing billing data received from at least one carrier by comparing some of the event data with the billing data to identify a billing issue further comprises identifying either lost revenue or carrier liability.

20. The method of claim 19, further comprising performing a statistical analysis on the one or more elements to identify the billing issue.

21. The method of claim 20, wherein receiving event data further comprises at least one of:
    receiving the event data in real time from the one or more devices; or receiving the event data from the one or more devices when transmitted by the one or more devices, wherein the one or more devices store and forward the event data.

22. The method of claim 18, wherein identifying one or more elements that contribute to the billing issue further comprises identifying the one or more elements that correspond to errors in the billing data of the carrier based on a comparison between the billing data of the carriers and the chargeable events received from the end user devices in the event data.

23. The method of claim 18, wherein the collected event data includes a complete context of the collected event data, the context including at least one or more of a carrier, a network, a type of network, or a location of the device.

24. In a wireless network of a carrier that provides services to multiple end user devices, a method for evaluating a billing system of the wireless network, the method comprising:
provisioning end user devices with a collection profile, the collection profile configured to enable each device to identify and collect billable events at the end user device, wherein a sufficient number of end user devices are provisioned with the collective profile such that statistically distributed losses result in an adequate sample set of the event data and such that event data with complete contextual data is captured;
receiving event data from one or more end user devices operating in one or more wireless networks, wherein the event data represents chargeable events of the one or more end user devices; and
auditing billable data from at least one carrier using the event data by comparing the event data with the billable data, wherein the event data is collected independently of the billable data.

25. A non-transitory computer readable medium having computer executable instructions for performing, in a wireless network of a carrier that provides services to multiple end user devices, a method for evaluating a billing system of the wireless network, the method comprising:
provisioning end user devices with a collection profile, the collection profile configured to enable each device to identify and collect billable events at the end user device, wherein a sufficient number of end user devices are provisioned with the collective profile such that statistically distributed losses result in an adequate sample set of the event data and such that event data with complete contextual data is captured;
receiving event data from one or more end user devices operating in one or more wireless networks, wherein the event data represents chargeable events of the one or more end user devices; and
auditing billable data from at least one carrier using the event data by comparing the event data with the billable data, wherein the event data is collected independently of the billable data.

* * * * *